(12) United States Patent
Miller et al.

(10) Patent No.: US 8,325,351 B2
(45) Date of Patent: Dec. 4, 2012

(54) LAYOUT METHOD

(75) Inventors: Robert Miller, Commerce City, CO (US); John Hooper Inman, Denver, CO (US)

(73) Assignee: Trimble Navigation Limited, Sunnyvale, CA (US)

( * ) Notice: Subject to any disclaimer, the term of this patent is extended or adjusted under 35 U.S.C. 154(b) by 231 days.

(21) Appl. No.: 12/915,997

(22) Filed: Oct. 29, 2010

(65) Prior Publication Data

US 2012/0105870 A1 May 3, 2012

(51) Int. Cl.
*G01B 11/00* (2006.01)

(52) U.S. Cl. ........................................ 356/614

(58) Field of Classification Search .............. None
See application file for complete search history.

(56) References Cited

U.S. PATENT DOCUMENTS

| 6,052,083 | A | 4/2000 | Wilson |
| 6,140,957 | A | 10/2000 | Wilson et al. |
| 6,166,802 | A * | 12/2000 | Kodaira et al. ............ 356/4.08 |
| 6,246,468 | B1 | 6/2001 | Dimsdale |
| 6,480,148 | B1 | 11/2002 | Wilson et al. |
| 6,590,640 | B1 | 7/2003 | Aiken et al. |
| 6,850,946 | B1 | 2/2005 | Rappaport et al. |
| 7,313,506 | B2 | 12/2007 | Kacyra et al. |
| 2008/0046221 | A1 | 2/2008 | Stathis |
| 2008/0074638 | A1 | 3/2008 | Sakimura et al. |
| 2009/0133467 | A1 * | 5/2009 | Mori et al. ............ 73/1.77 |
| 2009/0138233 | A1 | 5/2009 | Kludas et al. |

OTHER PUBLICATIONS

Feldman, William et al., "Work Management Software for the Field", Contractormag.com, Jul. 1, 2008.
Office Action pertaining to U.S. Appl. No. 12/274,876 dated Sep. 28, 2010.
Notice of Allowance pertaining to U.S. Appl. No. 12/274,876 dated Jan. 21, 2011.

* cited by examiner

*Primary Examiner* — Tu Nguyen
(74) *Attorney, Agent, or Firm* — Dinsmore & Shohl, LLP (57) ABSTRACT

A method of directing a beam of laser light at a target point defined by the intersection of a reference line with a generally vertical surface may comprise: a.) defining the reference line, b.) calculating a three dimensional location of a point on the line, c.) directing a beam of laser light from an automated total station toward the point on the line, d.) measuring the three dimensional location of the reference point on the vertical surface illuminated by the beam of laser light, e.) determining the point on the line closest to the reference point on the surface, f.) redirecting the beam of laser light from the automated total station toward the point on the line closest to the reference point, and g.) repeating steps d.) through f.) until the closest point on the reference line is less than a predetermined distance from the reference point.

27 Claims, 5 Drawing Sheets

LAYOUT METHOD

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

Laying out mechanical, electrical and plumbing systems in new buildings under construction, or in existing buildings undergoing renovations or additions, is tedious, time consuming, and expensive. Typically, it has required a significant amount of labor to lay out construction points at a construction site on walls and on other generally vertical surfaces, so that cuts can be made to permit the passage of pipes, conduits and the like through the walls and other generally vertical surfaces and to permit the installation of various switches, fittings and similar devices. This layout process has required teams of workers that measure and mark the locations of these construction points, with much of the work being accomplished manually.

A number of factors increase the difficulty of this manual layout process. Actual walls at a construction site may not be located precisely where construction plans indicate. Walls may be curved, angled (i.e., not perpendicular to the penetrating system), or tilted vertically, either by design or simply as a result of being inadvertently out of plumb. If the system penetrating the wall is sloped (e.g., a downward sloping drain pipe), the elevation of the system at the penetration location will change, depending on the actual location of the wall. Similarly, if the system penetrating the wall is angled to the right or left, the horizontal location of the system at the penetration location will change, depending on the actual location of the wall. The data defining the location of the system penetrating the wall may not include a design point precisely at the wall surface, or the location where the construction plans indicate the wall surface should be located may be in error.

Manually measuring and accounting for all of these variables to locate construction points on walls and other vertical surfaces is very difficult and very time consuming. This process is also subject to errors, both from measurement mistakes and from accumulated errors which compound as successive measurements are made going from one intermediate point to the next. Further, building designs and requirements have become more complex, and construction schedules have become tighter, adding to the need to facilitate and simplify the layout process.

Total stations have been used in the past both for outdoor surveying, and for machine control. In a typical surveying application, a total station, positioned at a known location, directs a beam of laser light to a target positioned by a surveyor at a point to be surveyed. The target may include retroreflectors which reflect the beam back to the total station. By measuring the time of flight of the beam, the distance between the total station and the target is determined. By also measuring the direction of the beam from the total station to the target, i.e., the altitude and azimuth angles that define a vector from the total station to the target, the location of the target can be precisely determined.

Robotic or automated total stations have been developed that are capable of locating and tracking a target without being attended by an operator, and without requiring that the target have a retroreflective surface. Further, such automated total stations can be controlled to point in precisely determined directions. A total station can point to surfaces throughout a worksite and, by detecting the light reflected from those surfaces, determine the three dimensional coordinates of the illuminated points throughout the worksite in relation to the position of the total station. If the coordinates of the total station are known, the coordinates of the illuminated points are also known.

A method of using an automated total station to facilitate layout of a series of points at an indoor construction site on a horizontal surface, such as a floor or a ceiling, is disclosed in U.S. patent application Ser. No. 12/274,876, filed Nov. 20, 2008, published as Publication No. US-2010-0123892, which is assigned to the assignee of the present application. The entire disclosure of Publication No. US-2010-0123892 is incorporated herein by reference. This method takes into account unexpected ceiling and floor locations by illuminating with a laser beam of visible light from a total station a construction point on the surface that has the same horizontal position coordinates (i.e., x and y coordinates) as the selected construction point on the ceiling or floor of nominal elevation. It is desirable to be able to lay out construction points precisely on generally vertical surfaces at a construction site, as well, and to have the ability to accommodate vertical surfaces that are not located precisely as anticipated, and are not precisely vertical.

SUMMARY

This need is met by a method of directing a beam of laser light at a target point on a generally vertical surface defined by the intersection of a reference line with the surface. The method includes the steps of defining the reference line, calculating the three dimensional location of a point on the line, directing a beam of laser light from an automated total station toward the point on the line, and measuring the three dimensional location of the reference point on the surface illuminated by the beam of laser light. The method further includes the steps of determining the point on the reference line closest to the reference point on the surface, and redirecting the beam of laser light from the automated total station toward the point on the reference line closest to the reference point. Finally, the last three steps are repeated until the point on the reference line closest to the reference point is less than a predetermined distance from the reference point.

The method of directing a beam of laser light at a target point on a generally vertical surface defined by the intersection of a reference line with the surface, may further include the step of terminating the last step once the three prior steps have been repeated a predetermined number of times without the point on the reference line closest to the reference point being less than a predetermined distance from the reference point. The method may include the step of terminating the last step once the three prior steps have been repeated without the reference point on the wall being closer to the reference line than the prior reference point on the surface. The method may further include the step of providing an indication in the event that the final reference point determined does not lie on the reference line between the first and second line end points. The method may further include the step of establishing the location of the automated total station. The reference line may be defined by the selection of two points on the reference line, such as at ends of the reference line, or by the selection of a point and a vector.

A method of establishing the location of a target point on a generally vertical surface at a construction site, includes the steps of: a.) inputting construction data into a handheld device, the construction data defining a reference line with first and second line end points, b.) calculating the three dimensional location of a point on the line, and c.) generating a beam of laser light with an automated total station and directing the beam of laser light toward the point on the line. The method further includes the steps of: d.) measuring the three dimensional location of a reference point on the surface illuminated by the beam of laser light, e.) determining the point on the reference line closest to the reference point on the surface, f.) redirecting the beam of laser light from the automated total station toward the point on the reference line closest to the reference point, and g.) repeating steps d.) through f.) until the point on the reference line closest to the reference point is less than a predetermined distance from the reference point, or until steps d.) through f.) have been repeated a predetermined number of times without establishing a reference point that is less than the predetermined distance form the reference line, or until steps d.) through f.) have been repeated without the reference point on the surface in step d.) being closer to the reference line than the prior reference point on the surface.

The method may include the further step of h.) after steps d.) through f.) have been repeated a predetermined number of times and a reference point is established which is more than a predetermined distance from the reference line, repeating steps d.) through f.) again, beginning with the last established reference point, until the point on the reference line closest to the reference point is less than a predetermined distance from the reference point, or until steps d.) through f.) have been repeated a predetermined number of times without establishing a reference point that is less than the predetermined distance form the reference line, or until steps d.) through f.) have been repeated without the reference point on the surface in step d.) being closer to the reference line than the prior reference point on the surface.

A method of establishing the location of one of a series of reference points on a generally vertical surface at a construction site by illumination of a point on the surface with an automated total station, where the reference point is defined by the intersection of a reference line having first and second end points and the building surface, includes the steps of: a.) selecting first and second end points for the reference line, b.) determining the location of the midpoint of the reference line, c.) generating a beam of laser light, d.) directing the beam of laser light toward the midpoint of the reference line, e.) illuminating a reference point on the building surface, f.) determining the point on the reference line closest to the reference point on the building surface, g.) redirecting the beam of laser light from the automated total station toward the point on the reference line closest to the reference point, h.) illuminating a new reference point on the building surface, and i.) repeating steps f.)-h.) until the point on the reference line closest to the reference point on the building surface is less than a predetermined distance from the reference point to the closest point on the reference line.

The method may further include the step of terminating step i.) once steps f.) through h.) have been repeated without the new reference point on the building surface in step h.) being closer to the reference line than the prior reference point. The method may further include the step of terminating step i.) once steps f.) through h.) have been repeated a predetermined number of times without the point on the reference line closest to the reference point being less than a predetermined distance from the reference point. Finally, the method may further include the step of providing an indication when the reference point is on the reference line, but not between the first and second line end points.

DETAILED DESCRIPTION OF THE PREFERRED EMBODIMENTS

The described methods may be advantageously used in establishing the locations of construction points on walls and other generally vertical surfaces at a construction site. As an example, during the construction of a building, mechanical contractors must locate and install pipes and ducts above, below, and through ceilings, floors, walls, and other generally vertical partitions. For such building components, the contractor is typically given a blueprint of the ducts, pipes, and points to position and secure various electrical, plumbing, and mechanical components, with the three dimensional positions of the various construction points. Typically, the layout process required before cutting openings in walls and other generally vertical surfaces has been somewhat tedious, and has been made more difficult by the fact that the walls and surfaces are not always plumb, and are often located in positions that differ significantly from the positions indicated in the construction plans. The layout process is made even more difficult by the fact that sometimes the pipes or ducts passing through the walls are not precisely perpendicular to the walls. As a consequence, a small difference between the actual position of a wall and the anticipated position of the wall may cause a significant change in the actual position of the opening in the wall.

The present method provides a way of more quickly establishing the location of construction points on generally vertical surfaces at a construction site. Each construction point is established by illuminating the point on the wall surface using an automated total station which provides a beam of visible laser light.

Figure 1:
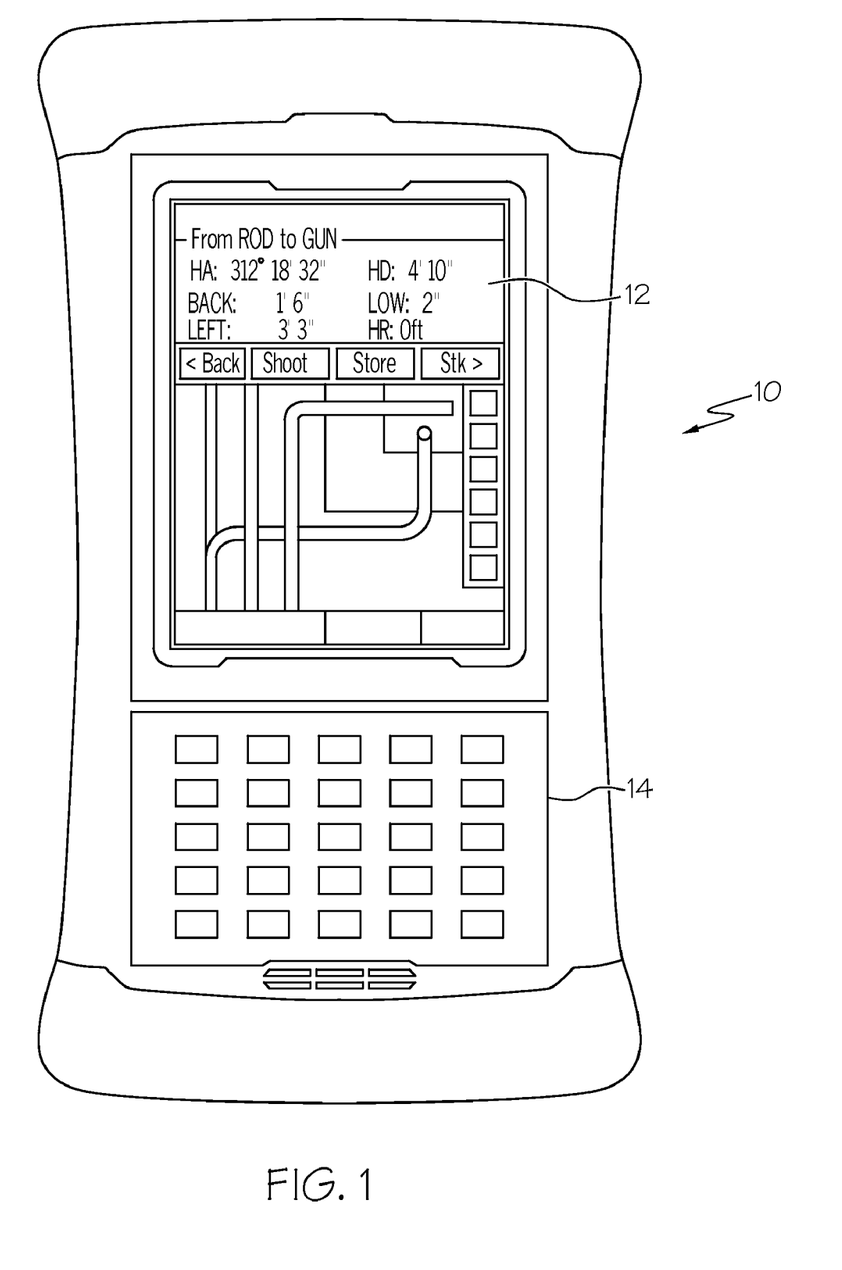
FIG. 1 is a plan view of a handheld device of the type that may be used in practicing the method.

To begin, construction data, defining a plurality of construction points at the construction site, is inputted into the handheld device 10 and displayed on a display 12, as shown in FIG. 1. The handheld device 10 includes a keyboard 14, a processor, memory, and a battery power source. Additionally, the handheld device 10 includes wireless communication capabilities, such as Wi-Fi, Bluetooth, radio, and cellular circuits which permit communication with an automated total station 16, shown in FIGS. 2 through 5, and also with a remote location, such as a contractor's business office which may be located miles from the construction site. The construction plans may be downloaded directly into the handheld device 10 from a computer through a USB port. Alternatively, the construction data may be received wirelessly at the construction site from a remote location, such as a contractor's office. The construction data may be received via e-mail at the construction site from the remote location.

Figure 2:
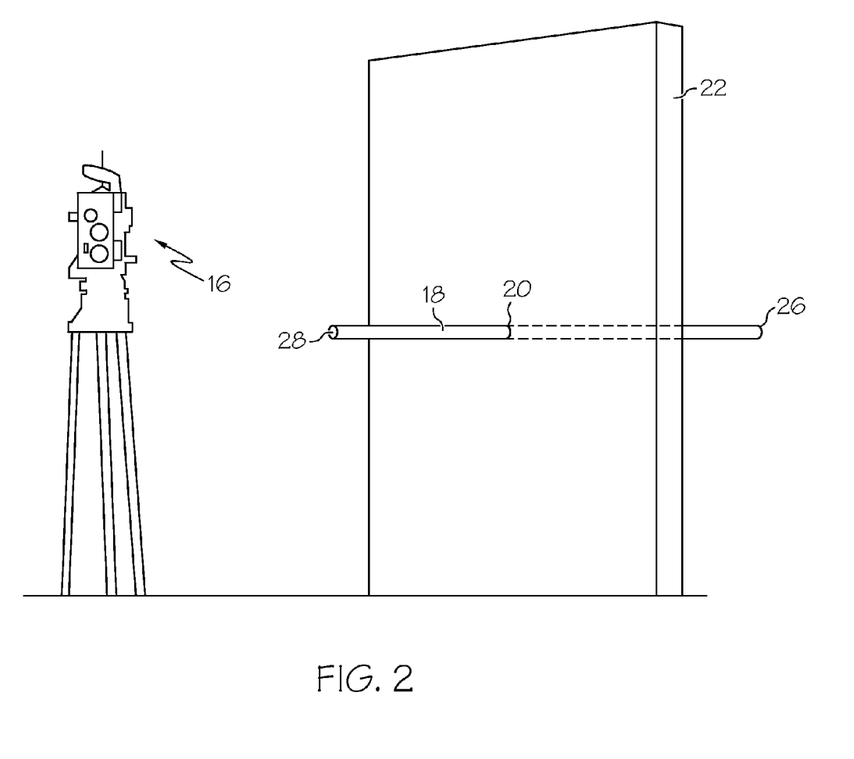
FIG. 2 is a view of an automated total station at a construction site having a wall through which a pipe passes.

When the location of a construction point at a construction site is to be established, the operator first must precisely position the automated total station 16 at the indoor construction site at a known point in relation to a three dimensional coordinate system. The operator then selects one of the plurality of points with the handheld device 10 which define the passage of pipes, vents, and similar elements through the walls at the construction site adjacent the automated total station 16. As shown in FIG. 2, a length of pipe 18 is designed to pass through an opening 20 in wall 22.

For this purpose, a beam of laser light is directed at a target point on the wall 22 defined by the intersection of a reference line 24 (FIGS. 4 and 5) with the wall. The reference line may be defined by first and second end points 26 and 28. As shown in FIG. 2, the first and second end points 26 and 28 may be selected as the centers of the end points of the length of pipe that will pass through the wall 22. The end points 26 and 28 may, however, be located at points other than the end points of the length of pipe, as long as they define a line that is coincident with the portion of the pipe that is to pass through the wall 22.

Figure 3:
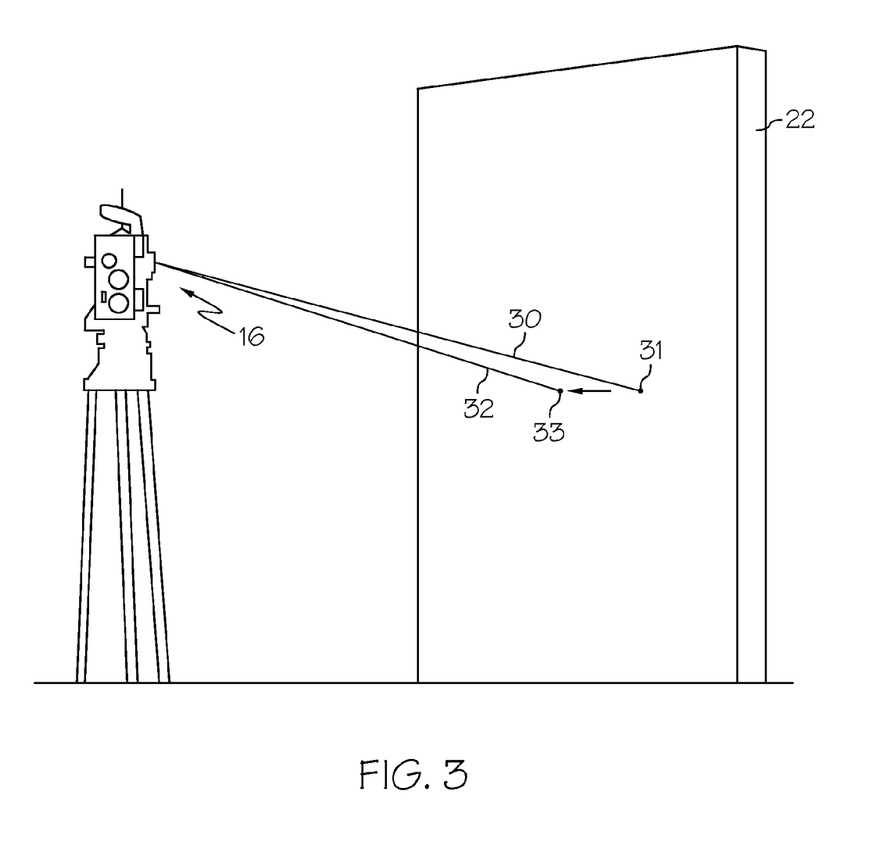
FIG. 3 illustrates the method of establishing a construction point at the construction site, and more specifically the manner in which the automated total station directs a visible beam of laser light to a point on the wall, defining the point on the wall where an opening is to be cut to accommodate passage of the pipe.

The operator then transmits data regarding the selected end points wirelessly from the handheld device 10 to the automated total station 16. The automated total station 16 generates a beam of laser light, and directs the beam of light from the automated total station 16 to a target point on the wall 22. As seen in FIG. 3, the total station 16 first directs the beam 30 to a target 31 on the wall 22. When the location of the target point 31 is found not to be on the line 24, the total station 16 directs the beam 32 toward target point 33 on the wall 20. Another check is then made to determine whether target point 33 lies on the line 24. This process is repeated a number of times to locate a target point which is both on the surface of the wall and on the line 24. The target point then can be marked by the operator so that the hole 20 for the pipe 18 can be cut.

Figure 4:
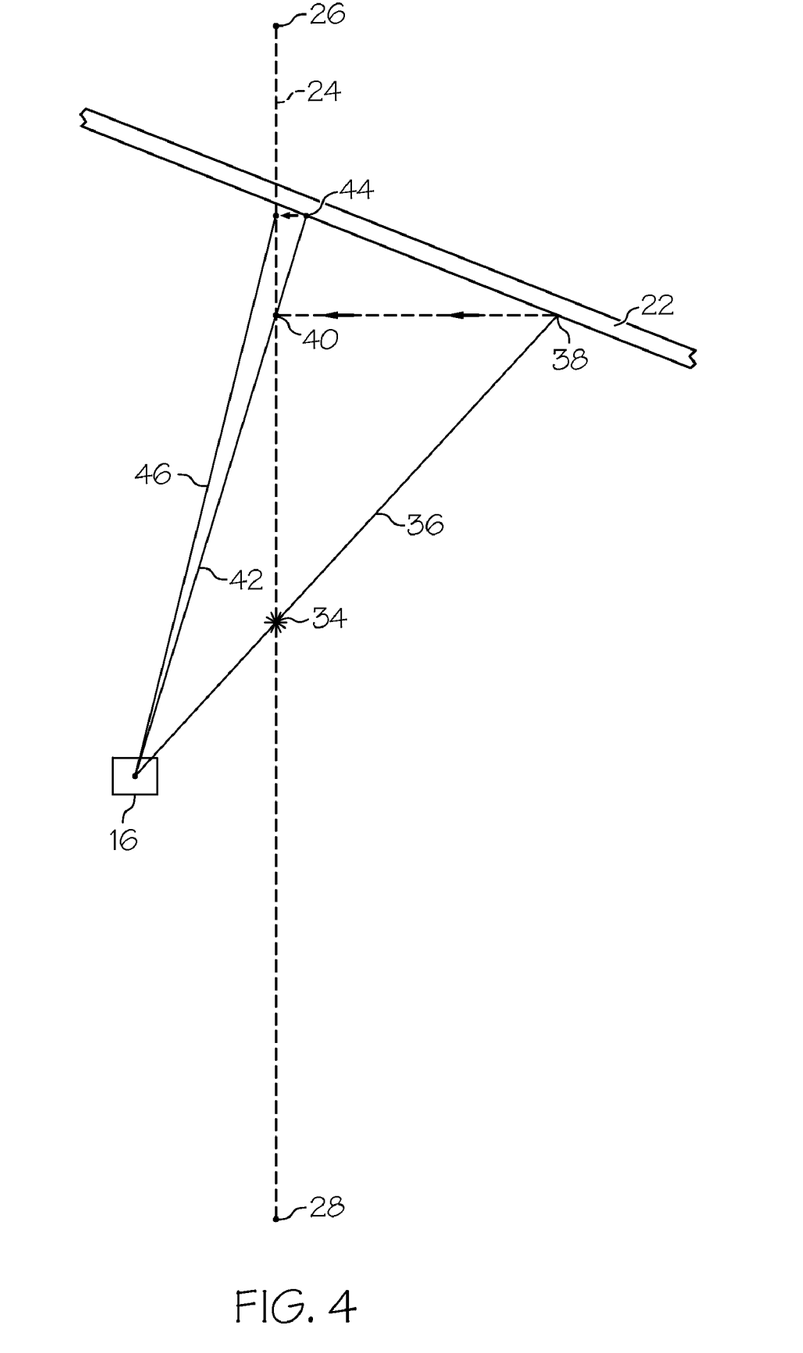
FIG. 4 is a plan view of the automated total station and the wall, illustrating the manner in which a point on the wall is established so that an opening can be cut.
Figure 5:
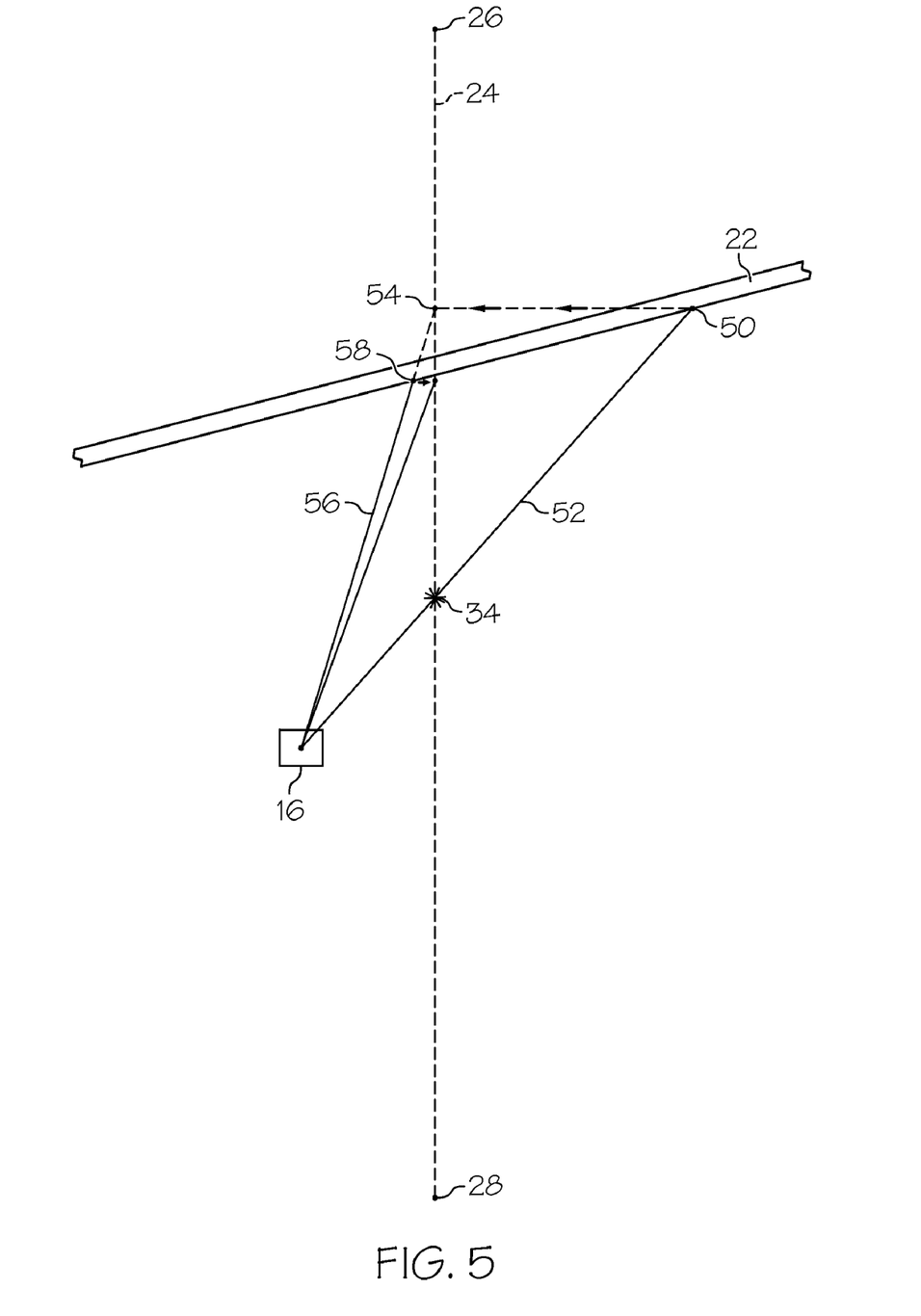
FIG. 5 is a plan view, similar to FIG. 4, of the automated total station and the wall, illustrating the steps taken by the automated total station when the wall and the line defining the path of the pipe are oriented differently than in FIG. 4.

The manner in which this iterative process is accomplished is shown in FIGS. 4 and 5. As seen in FIG. 4, the end points 26 and 28 are initially selected to define the line 24. Next, the three dimensional location of the midpoint of the line is calculated as point 34. It is not required that the precise midpoint of the line be used in this step, since any other point on the line could be used. The midpoint is suggested here since it is easily calculated. The beam of laser light 36 is then directed from the automated total station 16 toward the midpoint 34 or another point on the line with the result that a point 38 on the wall 22 is illuminated. The automated total station then measures the three dimensional location of the reference point 38 on the wall. If it is determined that the reference point 38 does not lie on reference line 24, the point 40 on the reference line 24 closest to the reference point 38 on the wall 22 is determined. Points 38 and 40 define a vector which is normal to, and intersects, line 24. The beam 42 of laser light from the total station 16 is then redirected toward point 40, the point on the reference line 24 closest to the reference point 38. This results in the illumination of a new reference point 44 on wall 22. These steps are repeated until the point on the reference line closest to the reference point is less than a predetermined distance from the reference point on the wall surface. In FIG. 4, the second beam redirection brings the beam 46 to illuminate a reference point that is within the predetermined distance of the line 24. In some construction applications, a predetermined distance of ⅛ inch may be used.

FIG. 5 illustrates this same process with the relative positions of the surface of the wall 22, the line 24 and the automated total station changed slightly, as compared to the positions in FIG. 4. As seen in FIG. 5, this method includes the steps of: a.) inputting construction data into a handheld device, the construction data defining a reference line 24 with first and second line end points 26 and 28, b.) calculating the three dimensional location of the midpoint 34 of the line 24 or other point on the line 24, c.) generating a beam of laser light with an automated total station 16 and directing the beam of laser light toward the midpoint 34 of the line 24, or other point on the line 24. The method also includes the steps of d.) measuring the three dimensional location of a reference point 50 on the wall 22 illuminated by the beam 52 of laser light. The point 54 on the reference line 24 closest to the reference point 50 is then determined, and the beam of laser light 56 from the automated total station 16 is redirected toward the point 54 on the reference line 24. This results in the illumination of a reference point 58. Steps d.) through f.) are then repeated until the point on the reference line closest to the reference point is less than a predetermined distance from the reference point. In the process illustrated in FIG. 3, only a second iteration of the process is necessary to achieve acceptable accuracy. It will be appreciated, however, that depending upon the geometry of the wall surface or the adjacent walls, the accuracy to be achieved, the orientation of the reference line, and the position of the automated total station, a number of additional iterations of this process may be needed.

The number of iterations performed by the automated total station is limited to prevent the system from inadvertently becoming caught in an endless loop in which repeated shifts in the beam position bring it no nearer to the target point on the wall. This is prevented in several ways. The number of iterations can be limited to a predetermined number. If the iterative steps are repeated a predetermined number of times without establishing a reference point that is less than the predetermined distance from the reference line, the process is terminated. Alternatively, or in addition to this limitation, the distance from each successive reference point on the wall surface to the reference line may be determined, and the iterative process terminated in the event that a reference point on the wall surface is not closer to the reference line than the previously located reference point on the wall surface.

The method further includes the step of providing an indication in the event that the final reference point determined in the iterative process does not lie on the reference line between the first and second line end points. The final reference point may, for example, lie on an extension of the reference line, beyond one of the two reference end points. This may or may not indicate an acceptable target point on the wall. For example, the length of pipe, the ends of which define the end points for the reference line, may simply be one of several pipe segments that are connected in a straight line. In such an instance, the detection of the final reference point beyond one of the end points is not problematic. On the other hand, if the reference line is coextensive with a single, straight section of pipe, and the pipe is attached to other, non-aligned pipe sections, then using the target point established in this manner is likely to result in an improperly positioned opening in the wall.

In the event that the iterative process is discontinued because the process has been repeated a predetermined number of times and a reference point is established which is more than a predetermined distance from the reference line, the system may be actuated by a user to continue the iterative process for an additional predetermined number of times, beginning with the last established reference point, until the point on the reference line closest to the reference point is less than a predetermined distance from the reference point, or until the iterative process has been repeated the additional predetermined number of times without establishing a reference point that is less than the predetermined distance form the reference line.

The line 24 is defined in the examples, above, by the use specifying the coordinates of the end points 26 and 28 of the line. It will be appreciated, however, that the line 24 can be specified in any other manner desired. For example, the line 24 could be specified as a vector and an the coordinates of a point from which the vector extends. Other methods of specifying the line are also possible, such as calling out other points on the line which may not be the end points of the line.

Other aspects, objects, and advantages of the embodiments can be obtained from a study of the drawings, the disclosure, and the appended claims.

What is claimed is:

1. A method of directing a beam of laser light at a target point on a wall defined by the intersection of a reference line with the wall, the reference line being defined by first and second line end points, comprising the steps of:
   a.) selecting the first and second line end points,
   b.) calculating the three dimensional location of a point on the line,
   c.) directing a beam of laser light from an automated total station toward said point on the line,
   d.) measuring the three dimensional location of the reference point on the wall illuminated by said beam of laser light,
   e.) determining the point on the reference line closest to said reference point on the wall,
   f.) redirecting the beam of laser light from the automated total station toward the point on the reference line closest to said reference point, and
   g.) repeating steps d.) through f.) until the point on the reference line closest to said reference point is less than a predetermined distance from said reference point.

2. The method of directing a beam of laser light at a target point on a wall defined by the intersection of a reference line with the wall, according to claim 1, in which said method further comprises the step of terminating step g.) once steps d.) through f.) have been repeated a predetermined number of times without the point on the reference line closest to said reference point being less than a predetermined distance from said reference point.

3. The method of directing a beam of laser light at a target point on a wall defined by the intersection of a reference line with the wall according to claim 1, in which the point on the line in stops b.) and c.) is the midpoint of the line.

4. The method of directing a beam of laser light at a target point on a wall defined by the intersection of a reference line with the wall, according to claim 1, in which said method further comprises the step of terminating step g.) once steps d.) through f.) have been repeated without the reference point on the wall in step d.) being closer to the reference line than the prior reference point on the wall.

5. The method of directing a beam of laser light at a target point on a wall defined by the intersection of a reference line with the wall, according to claim 1, in which said method further comprises the step of providing an indication in the event that the final reference point determined in step g.) does not lie on the reference line between the first and second line end points.

6. The method of directing a beam of laser light at a target point on a wall defined by the intersection of a reference line with the wall, according to claim 1, further comprising the step of establishing the location of the automated total station.

7. A method of establishing the location of a target point on a wall at a construction site, comprising the steps of:
   a.) inputting construction data into a handheld device, said construction data defining a reference line with first and second line end points,
   b.) calculating the three dimensional location of a point on the line,
   c.) generating a beam of laser light with an automated total station and directing the beam of laser light toward said point on the line,
   d.) measuring the three dimensional location of a reference point on the wall illuminated by said beam of laser light,
   e.) determining the point on the reference line closest to said reference point on the wall,
   f.) redirecting the beam of laser light from the automated total station toward the point on the reference line closest to said reference point, and
   g.) repeating steps d.) through f.) until the point on the reference line closest to said reference point is less than a predetermined distance from said reference point, or until steps d.) through f.) have been repeated a predetermined number of times without establishing a reference point that is less than said predetermined distance form said reference line, or until steps d.) through f.) have been repeated without the reference point on the wall in step d.) being closer to the reference line than the prior reference point on the wall.

8. The method of claim 7, further comprising the step of:
   h.) after steps d.) through f.) have been repeated a predetermined number of times and a reference point is established which is more than a predetermined distance from said reference line, repeating steps d.) through f.) again, beginning with the last established reference point, until the point on the reference line closest to said reference point is less than a predetermined distance from said reference point, or until steps d.) through f.) have been repeated a predetermined number of times without establishing a reference point that is less than said predetermined distance form said reference line, or until steps d.) through f.) have been repeated without the reference point on the surface in step d.) being closer to the reference line than the prior reference point on the wall.

9. The method of claim 7, in which the point on the line in steps b.) and c.) is the midpoint of the line.

10. A method of establishing the location of one of a series of reference points on a generally vertical surface at a construction site by illumination of a point on said surface with an automated total station, where the reference point is defined by the intersection of a reference line having first and second end points and the building surface, comprising the steps of:
    a.) selecting first and second end points for said reference line,
    b.) determining the location of a point on said reference line,
    c.) generating a beam of laser light,
    d.) directing the beam of laser light toward said point on said reference line,
    e.) illuminating a reference point on the building surface, f.) determining the point on the reference line closest to said reference point on the building surface, g.) redirecting the beam of laser light from the automated total station toward the point on the reference line closest to said reference point, h.) illuminating a new reference point on the building surface, i.) repeating steps f.)-h.) until the point on the reference line closest to said reference point on the building surface is less than a predetermined distance from said reference point to said closest point on the reference line.

11. The method of establishing the location of one of a series of reference points on a generally vertical surface at a construction site by illumination of a point on said surface with an automated total station according to claim 10, in which said point on said reference line in steps b.) and d.) is the midpoint of the reference line.

12. The method of establishing the location of one of a series of reference points on a generally vertical surface at a construction site by illumination of a point on said surface with an automated total station according to claim 10, further comprising the step of terminating step i.) once steps f.) through h.) have been repeated without the new reference point on the building surface in step h.) being closer to the reference line than the prior reference point.

13. The method of establishing the location of one of a series of reference points on a generally vertical surface at a construction site by illumination of a point on said surface with an automated total station according to claim 10, further comprising the step of terminating step i.) once steps f.) through h.) have been repeated a predetermined number of times without the point on the reference line closest to said reference point being less than a predetermined distance from said reference point.

14. The method of establishing the location of one of a series of reference points on a generally vertical surface at a construction site by illumination of a point on said surface with an automated total station according to claim 10, further comprising the step of providing an indication when the reference point is on the reference line, but not between said first and second line end points.

15. A method of directing a beam of laser light at a target point on a wall defined by the intersection of a reference line with the wall, comprising the steps of:
  a.) defining the reference line,
  b.) calculating the three dimensional location of a point on the line,
  c.) directing a beam of laser light from an automated total station toward said point on the line,
  d.) measuring the three dimensional location of the reference point on the wall illuminated by said beam of laser light,
  e.) determining the point on the reference line closest to said reference point on the wall,
  f.) redirecting the beam of laser light from the automated total station toward the point on the reference line closest to said reference point, and
  g.) repeating steps d.) through f.) until the point on the reference line closest to said reference point is less than a predetermined distance from said reference point.

16. The method of directing a beam of laser light at a target point on a wall defined by the intersection of a reference line with the wall, according to claim 15, in which said method further comprises the step of terminating step g.) once steps d.) through f.) have been repeated a predetermined number of times without the point on the reference line closest to said reference point being less than a predetermined distance from said reference point.

17. The method of directing a beam of laser light at a target point on a wall defined by the intersection of a reference line with the wall according to claim 15, in which the point on the line in stops b.) and c.) is the midpoint of the line.

18. The method of directing a beam of laser light at a target point on a wall defined by the intersection of a reference line with the wall, according to claim 15, in which said method further comprises the step of terminating step g.) once steps d.) through f.) have been repeated without the reference point on the wall in step d.) being closer to the reference line than the prior reference point on the wall.

19. The method of directing a beam of laser light at a target point on a wall defined by the intersection of a reference line with the wall, according to claim 15, in which said method further comprises the step of providing an indication in the event that the final reference point determined in step g.) does not lie on the reference line between the first and second line end points.

20. The method of directing a beam of laser light at a target point on a wall defined by the intersection of a reference line with the wall, according to claim 15, further comprising the step of establishing the location of the automated total station.

21. A method of establishing the location of a target point on a wall at a construction site, comprising the steps of:
  a.) inputting construction data into a handheld device, said construction data defining a reference line,
  b.) calculating the three dimensional location of a point on the line,
  c.) generating a beam of laser light with an automated total station and directing the beam of laser light toward said point on the line,
  d.) measuring the three dimensional location of a reference point on the wall illuminated by said beam of laser light,
  e.) determining the point on the reference line closest to said reference point on the wall,
  f.) redirecting the beam of laser light from the automated total station toward the point on the reference line closest to said reference point, and
  g.) repeating steps d.) through f.) until the point on the reference line closest to said reference point is less than a predetermined distance from said reference point, or until steps d.) through f.) have been repeated a predetermined number of times without establishing a reference point that is less than said predetermined distance form said reference line, or until steps d.) through f.) have been repeated without the reference point on the wall in step d.) being closer to the reference line than the prior reference point on the wall.

22. The method of claim 21, further comprising the step of:
  h.) after steps d.) through f.) have been repeated a predetermined number of times and a reference point is established which is more than a predetermined distance from said reference line, repeating steps d.) through f.) again, beginning with the last established reference point, until the point on the reference line closest to said reference point is less than a predetermined distance from said reference point, or until steps d.) through f.) have been repeated a predetermined number of times without establishing a reference point that is less than said predetermined distance form said reference line, or until steps d.) through f.) have been repeated without the reference point on the surface in step d.) being closer to the reference line than the prior reference point on the wall.

23. The method of claim 21, in which the point on the line in steps b.) and c.) is the midpoint of the line.

24. A method of establishing the location of one of a series of reference points on a generally vertical surface at a construction site by illumination of a point on said surface with an automated total station, where the reference point is defined by the intersection of a reference line and the building surface, comprising the steps of:
   a.) defining said reference line,
   b.) determining the location of a point on said reference line,
   c.) generating a beam of laser light,
   d.) directing the beam of laser light toward said point on said reference line,
   e.) illuminating a reference point on the building surface,
   f.) determining the point on the reference line closest to said reference point on the building surface,
   g.) redirecting the beam of laser light from the automated total station toward the point on the reference line closest to said reference point,
   h.) illuminating a new reference point on the building surface, and
   i.) repeating steps f.)-h.) until the point on the reference line closest to said reference point on the building surface is less than a predetermined distance from said reference point to said closest point on the reference line.

25. The method of establishing the location of one of a series of reference points on a generally vertical surface at a construction site by illumination of a point on said surface with an automated total station according to claim 24, in which said step of defining said reference line includes the step of specifying a pair of points on said line.

26. The method of establishing the location of one of a series of reference points on a generally vertical surface at a construction site by illumination of a point on said surface with an automated total station according to claim 25, in which said step of specifying a pair of points on said line includes the step of specifying a pair of end points for said line.

27. The method of establishing the location of one of a series of reference points on a generally vertical surface at a construction site by illumination of a point on said surface with an automated total station according to claim 24, in which said step of defining said reference line includes the step of specifying a point and a vector.

* * * * *

UNITED STATES PATENT AND TRADEMARK OFFICE
CERTIFICATE OF CORRECTION

PATENT NO. : 8,325,351 B2
APPLICATION NO. : 12/915997
DATED : December 4, 2012
INVENTOR(S) : Robert Miller et al.

It is certified that error appears in the above-identified patent and that said Letters Patent is hereby corrected as shown below:

In the Claims:

Col. 8, Claim 7, Line 31, "distance form" should read --distance from--;

Col. 8, Claim 8, Line 47, "distance form" should read --distance from--;

Col. 10, Claim 21, Line 47, "distance form" should read --distance from--; and

Col. 10, Claim 22, Line 63, "distance form" should read --distance from--.

Signed and Sealed this
Thirtieth Day of July, 2013

Teresa Stanek Rea
*Acting Director of the United States Patent and Trademark Office*